United States Patent [19]
Watanabe

[11] 3,866,188
[45] Feb. 11, 1975

[54] MEMORY CIRCUIT

[75] Inventor: Hiroshi Watanabe, Tokyo, Japan

[73] Assignee: Nippon Electric Company, Limited, Mirato-ku, Tokyo, Japan

[22] Filed: Sept. 18, 1973

[21] Appl. No.: 398,339

[30] Foreign Application Priority Data

Sept. 19, 1972 Japan .............................. 47-94371

[52] U.S. Cl. .......................... 340/173 DR, 307/238
[51] Int. Cl. .......................................... G11c 11/40
[58] Field of Search ............................ 340/173 DR

[56] References Cited

UNITED STATES PATENTS 3,748,651 7/1973 Mesnik ...................... 340/173 DR
3,790,961 2/1974 Palfi ............................ 340/173 DR

*Primary Examiner*—Terrell W. Fears
*Attorney, Agent, or Firm*—Hopgood, Calimafde, Kalil, Blaustein & Lieberman

[57] ABSTRACT

In a dynamic memory circuit which utilizes a periodic refreshing cycle, a clamping signal is provided which prevents an incoming access signal from interrupting the refreshing cycle during a period of the cycle when the stored information in the memory circuit could be destroyed as a result of such interruption.

8 Claims, 12 Drawing Figures

MEMORY CIRCUIT

BACKGROUND OF THE INVENTION

The present invention relates to memory circuits of the dynamic type consisting essentially of semiconductor elements.

The dynamic memory is usually dependent upon capacitive elements for storing data in terms of electric charge. This type of memory loses the stored data gradually with a lapse of time due to the leakage of charges from the capacitive elements so that the charges on the capacitive elements must be refreshed periodically. In other words, the dynamic memory must be operated with an extra cycle time for refreshing the level of the capacitive elements in addition to a normal cycle time for reading and writing data out of and into the capacitive elements. In one dynamic memory system the first half of each cycle time of the memory system is used for the normal operating cycle time, and the second half of each cycle time is used for refreshing the memory. This system is practicable only where the memory system receives constant accesses from the central processing unit (CPU) or where the cycle of the memory system can be fixed.

In a memory system of the type in which the accesses from the CPU are occasionally discontinued and the next access after the discontinuity may be asynchronously supplied, the refreshing cycle should be executed asynchronously with the CPU access during the period when no access arrives from CPU. In such a system it can occur that an access signal will come into the memory system during the execution of the refreshing cycle. To reduce the access time of the system in such an occurrence, it is necessary to interrupt the refreshing cycle and to execute the ordinary memory (read and/or write) operation.

If it is impossible to interrupt the execution of the refreshing cycle and the requested read and/or write operation is obliged to start after the refreshing cycle, it will take an extra period of time equal to one refreshing cycle to carry out the requested read and/or write operation in the memory system. While, if the refreshing cycle is interrupted, there is a possibility that the stored data will be destroyed, although such destructionn will occur only during a limited part of the refreshing cycle time.

Therefore, it is an object of the invention to provide a dynamic memory circuit capable of reducing the access time while preventing the data stored in the memory circuit from being destroyed.

SUMMARY OF THE INVENTION

The memory circuit of this invention includes means for generating a clamping signal having a duration at least equal to the period of time during which the stored information in the memory cell may be destroyed when an interruption of the refreshing cycle occurs. The clamping signal is generated during the period from the occurrence of a re-write command signal which occurs during the refreshing operation to the end of the period of time during which the stored information could be destroyed. This clamping signal clamps the memory circuit to prevent the interruption of the refreshing cycle when the access signal is supplied to the memory circuit during the duration of the clamping signal.

In the dynamic memory circuit of this invention, when an access signal is supplied to the memory circuit during the refreshing operation, the refreshing operation is immediately halted if the condition of the circuit is such that a halt is permissible at that time without the destruction of stored data. When the access signal is supplied during a period in which the stored data would be destroyed due to the interruption of the refreshing cycle, the refreshing cycle is continued as if no access signal had been received because of the clamping signal. The decision as to whether or not to interrupt the refreshing cycle is made automatically in the memory circuit to enable a requested read and/or write operation to be started without waiting for the completion of the refreshing cycle in many cases and thus the read/write time is substantially shortened.

DESCRIPTION OF THE DRAWINGS

The other objects, features and advantages of the invention will become more apparent from the following description when read in conjunction with the accompanying drawings.

In the drawings.

DESCRIPTION OF THE INVENTION

For the sake of simplicity, the transistors used in the example circuits appearing in this application are assumed to be N-channel type MOS transistors.

Figure 1:
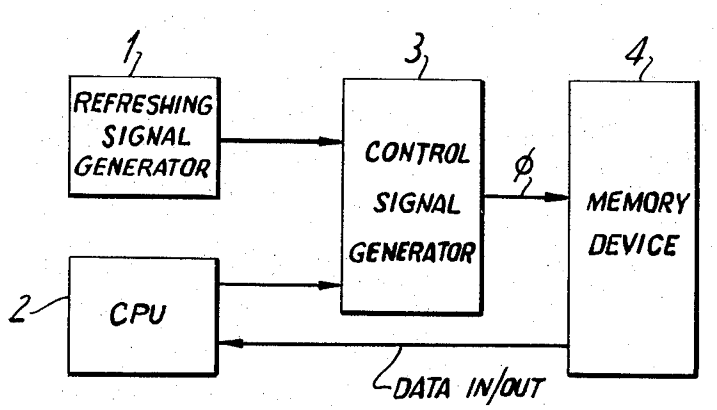
FIG. 1 is a block diagram showing the relationship among the memory device, the central processing unit, a refreshing signal generator, and a control signal generator.
Figure 3A:
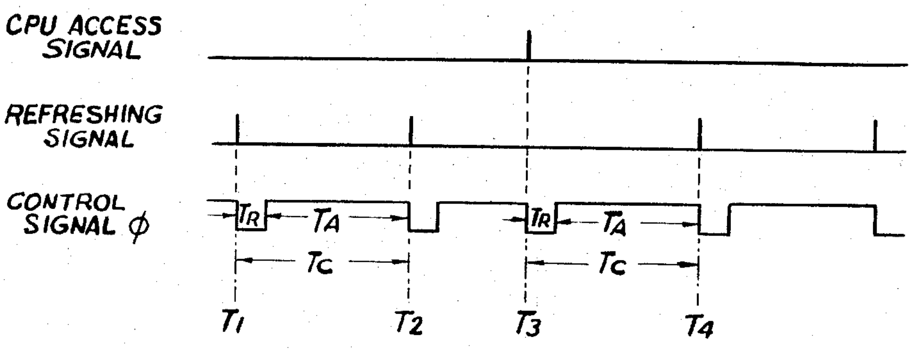
FIG. 3(*a*) shows waveforms of the CPU access signals, the refreshing signals and the control signals, FIG. 3(*b*) shows the waveforms of the timing pulses or command signals in the circuits of FIGS. 2(*a*), 6, 8, 9, and 10, which are represented in an enlarged manner between time points T1 and T4 of FIG. 3(*a*)
Figure 3B:
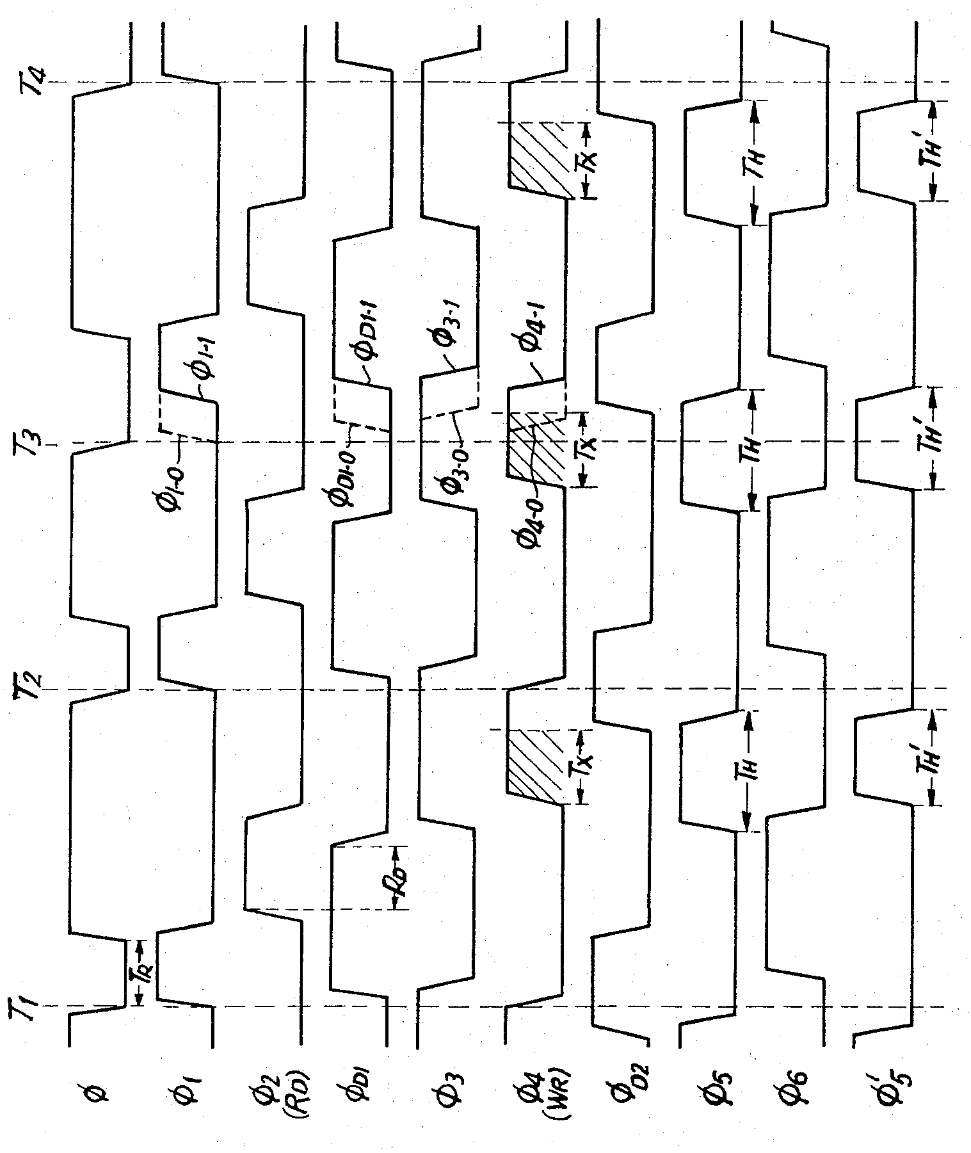

Referring to FIG. 1, a refreshing signal generator 1 generates a refreshing signal and sends it to a control signal generator 3. An external source such as a central processing unit (CPU) 2 generates an access signal which is also sent to the control signal generator 3. The control signal generator 3 generates a control signal $\phi$ in response to either an access signal from the CPU 2 or a refreshing signal from the refreshing signal generator 1. As shown in FIG. 3(*a*), control signals $\phi$ are generated in response to periodic refreshing signals at times $T_1$, $T_2$ and $T_4$. However, when a CPU access signal such as that shown at time $T_3$ is supplied asynchronously with the refreshing signal, a control signal is generated in response to the CPU access signal. In either case, the control signal provides a reset time period $T_R$ and an access time period $T_A$. The access time $T_A$ defines a time within which an internal read/write operation, here termed a refreshing operation or an external read/write operation is executed, while the reset time $T_R$ is a necessary time interval between the end of one internal or external read/write operation and the start of the next operation. The sum period $T_C$ of the reset time period $T_R$ and the access time period $T_A$ represents one cycle time of the memory device. The control signal $\phi$ is sent by the control signal generator 3 to a memory device 4. In response to the control signal $\phi$, the memory device 4 normally performs a refreshing operation, in which the stored information is read out of a memory cell and is then re-written into the same memory cell. The memory device 4 performs an external read/write operation, when a CPU access signal has been supplied to the control signal generator 3. In an external read/write operation the read-out information is supplied to the CPU and externally generated information from the CPU is written into the memory cell. In order to enable either refreshing or external read/-write operations, the memory device 4 generates, upon receiving the control signal $\phi$, a read signal $R_D(\phi_2)$ which commands the reading of the stored information out of the memory cell and a write signal $W_R(\phi_4)$ which commands either the re-writing into the cell of the information which had been stored there or the writing of externally supplied information into the cell.

Figure 2A:
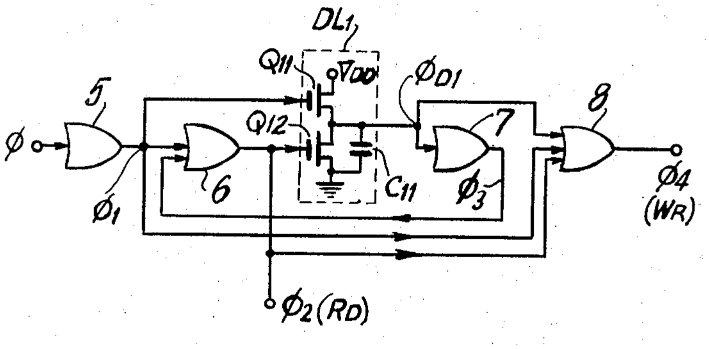
FIG. 2(*a*) is a block diagram of a conventional circuit for generating command signals for the read/write operation of the memory, FIG. 2(*b*) is a circuit diagram showing an example of the NOR circuit used in the circuit of FIG. 2(*a*)
Figure 2B:
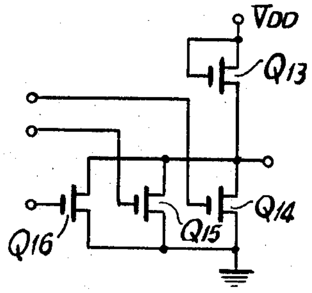

For the purpose of generating such read and write signals, the memory device 4 includes a circuit as shown in FIG. 2(*a*). The circuit of FIG. 2(*a*) comprises inverter circuits 5 and 7, NOR circuits 6 and 8, and a delay circuit $D_{L1}$. The control signal $\phi$ is applied to the inverter 5 and inverted into a signal $\phi_1$, which is applied to one input terminal of the two-input NOR circuit 6 and to one input terminal of the three-input NOR circuit 8, as well as to the gate of a load transistor $Q_{11}$ of the delay circuit $D_{L1}$. The output signal $\phi_2$ of the two-input NOR circuit 6 is used as the read command signal $R_D$ to read the stored information from the memory cells. Signal $\phi_2$ is also sent to one of the other input terminals of the three-input NOR circuit 8 and to the gate of a switching transistor $Q_{12}$ of the delay circuit $D_{L1}$. The output signal $\phi_{D1}$ of the delay circuit $D_{L1}$ goes to an inverter 7 and also to the remaining unoccupied input of the three-input NOR circuit 8. The output signal $\phi_3$ of the inverter 7 goes to the other input terminal of the two-input NOR circuit 6. The three-input NOR circuit 8 generates an output $\phi_4$ which is used as the write signal $W_R$ to command the write operation. The delay circuit $D_{L1}$ consists of two transistors $Q_{11}$ and $Q_{12}$ connected in series between ground and a power source $V_{DD}$. The output terinal of the delay circuit $D_{L1}$ is connected to the connection point of the two transistors $Q_{11}$ and $Q_{12}$. A capacitor $C_{11}$ is connected between this output terminal and ground. An example of a three-input NOR circuit which is usable as NOR circuit 8 is shown in FIG. 2(*b*). This NOR circuit consists of three switching transistors $Q_{14}$, $Q_{15}$ and $Q_{16}$ which are connected in parallel and a load transistor $Q_{13}$ which is connected in series between the switching transisters and a power supply $V_{DD}$. The gate electrodes of the three switching transistors $Q_{14}$ to $Q_{16}$ serve as the input terminals of the three-input NOR circuit. The two-input NOR circuit 6 may be formed as shown in FIG. 2(*b*) with the switching transistor $Q_{16}$ omitted. Each of the inverter circuits 5 and 7 may be formed as shown in FIG. 2(*b*) by omitting the two switching transistors $Q_{16}$ and $Q_{15}$. The operation of the circuit of FIG. 2 (*a*) will be described below by referring to FIG. 3 (*b*). At the time point $T_1$, the control signal $\phi$ turns to a low level causing $\phi_1$ to be high. High signal $\phi_1$ passes through delay circuit $D_{L1}$ and is applied to the inputs of the inverter circuit 7 and NOR circuit 8 turning the outputs $\phi_3$ and $\phi_4$ of the inverter 7 and the NOR gate 8 to the low level and precharging the output $\phi_{D1}$ of a delay circuit $D_{L1}$. The level of the control signal $\phi$ rises after the reset time period $T_R$ causing the signal $\phi_1$ which is the output of invertor 5 to turn to the low level, and the signal $\phi_2$ which is the output of NOR circuit 6 to go to a high level, since both inputs are low after a delay time in the operation of the inverter 5 and the NOR circuit 6. The output signal $\phi_2$ of NOR circuit 6 serves as a read command signal $R_D$ to command the start of the read operation. The delay circuit $D_{L1}$ operates to provide a delay time $T_D$ which corresponds to the time necessary to discharge the capacitor of the data line of the memory circuit. The output $\phi_{D1}$ of the delay circuit $D_{L1}$ is at a high level while the signal $\phi_1$ is at a high level, because the capacitor $C_{11}$ is being charged through the transistor $Q_{11}$ which is switched on by $\phi_1$. When the signal $\phi_2$ reaches a high level, the capacitor $C_{11}$ starts to be discharged through the transistor $Q_{12}$ which is switched on by $\phi_2$, but during the time constant $T_D$ of this discharge the capacitor $C_{11}$ maintains the output $\phi_{D1}$ at a high level. This delay time $T_D$ provides time for the completion of reading the stored information out of the memory cell. Therefore, the drop in the output $\phi_{D1}$ after the delay time $T_D$ is used to indicate the completion of the reading cycle and to terminate the read signal $\phi_2$. When the signal $\phi_{D1}$ drops to the low level, the output $\phi_3$ of the inverter 7 becomes high. The high signal $\phi_3$ is connected to an input of NOR 6 thereby turning the read command signal RD which is the output of the two-input NOR circuit 6 to a low level. Then, since all the inputs of NOR circuit 8 including the output $\phi_1$ of the inverter 5, the output $\phi_2$ of the NOR circuit 6 and the output $\phi_{D1}$ of the delay circuit $D_{L1}$ have all become low, the output $\phi_4$ of the three-input NOR circuit 8 rises to a high level. This signal $\phi_4$ serves as a write command signal $W_R$ to command the start of the write or rewrite operation. The input control signal $\phi$ turns to the low level again at a time T2 after a time sufficient for the completion of the rewrite or write operation has passed and after the output $\phi_4$ of the NOR circuit 8 has reached the high level. The signal $\phi_1$ which is the output of inverter 5 becomes high and is connected to one of the inputs of NOR circuit 8 causing the output $\phi_4$ of circuit 8 to become low. Thus, at time $T_2$ the outputs $\phi_1$ through $\phi_4$ of the individual parts of the circuit FIG. 2 (*a*) have returned to the initial values they had at time $T_1$ and one cycle is completed.

An example of the refreshing and external read/write operations executed within the dynamic memory cell in response to the read command signal $\phi_2$ ($R_D$) and the write command signal $\phi_4$ ($W_R$) which are provided in the manner described above will now be described with reference to FIGS. 4 and 5.

Figure 4:
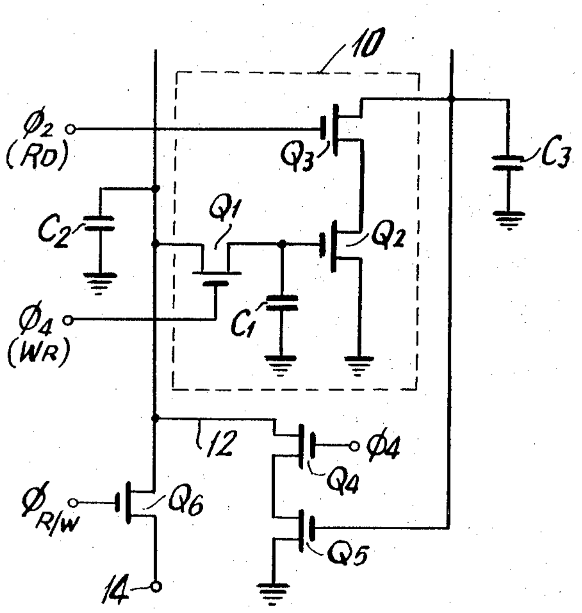
FIGS. 4 and 5 are circuit diagrams showing conventional dynamic memory cells.
Figure 5:
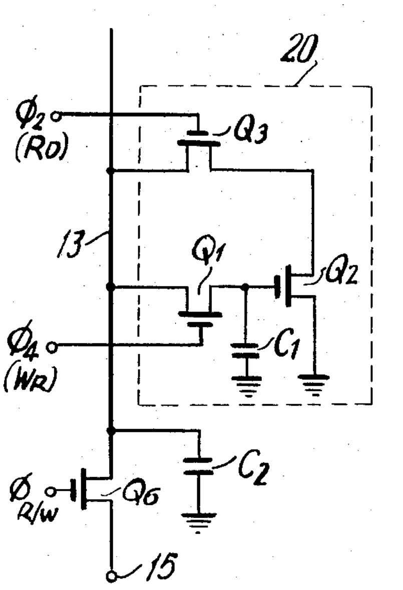

FIGS. 4 and 5 show respectively three-element dynamic memory cells 10 and 20 each comprising three MOS transistors $Q_1$, $Q_2$ and $Q_3$. In both circuits the transistor $Q_1$ operates as a write gate, the transistor $Q_3$ operates as a read gate, and the transistor $Q_2$ operates as an amplifier. A capacitor $C_1$ connected between the gate of the amplifier transistor $Q_2$ and ground stores the memory information in terms of the presence or absence of an electrical charge on the capacitor $C_1$. When the memory cell is not involved in a read or write operation, the read and write command signals $\phi_2$ and $\phi_4$ are both at the low level and both the read and write gates $Q_3$ and $Q_1$ are open. Under these conditions the charge stored on the capacitor $C_1$ is gradually released as a leakage current, and the memory will eventually be lost. Now, the read and write operations will be described by referring to FIG. 4. Capacitors $C_2$ and $C_3$ of the data lines 11 and 12 are precharged during the reset time period $T_R$. The read command signal $\phi_2$ rises to the high level and causes the read gate transistor $Q_3$ to turn on. If charges are stored in the capacitor $C_1$, the transistor $Q_2$ is already in the on state and hence, the charges stored in the capacitor $C_3$ of the data read line 11 will be discharged through the transistors $Q_3$ and $Q_2$ to the ground. If no charge is present in the capacitor $C_1$, the transistor $Q_2$ will be in the non-conducting or off state and hence the charges on the capacitor $C_3$ can not be discharged to ground through $Q_2$. In other words, by applying the read command signal $\phi_2$ to $Q_3$, the voltage of the data read line 11 will be caused to represent the inverse of the voltage stored on the capacitor $C_1$. Then, the write command signal $\phi_4$ rises to a high level, causing both transistors $Q_1$ and $Q_4$ to turn on. The conduction state of the transistor $Q_5$ which is connected in series with $Q_4$ depends on the voltage level of the data read line 11. The voltage level of the data write line 12 will therefore be the reverse of the voltage level of the data read line 11, and will therefore be the same as the capacitor $C_1$. In other words, the information read out of the capacitor $C_1$ to the data read line 11 is transferred to the data write line 12, by switching the transistor $Q_4$ on by means of the signal $\phi_4$. Since the write gate transistor $Q_1$ is also switched on by the write signal $\phi_4$, the level of the data write line 12 will be transferred through $Q_1$ into the capacitor $C_1$ of the memory cell. Thus, the stored information originally stored in $Q_1$ is rewritten into the memory cell 10 and the refreshing operation is completed. If a cycle TC is initiated by a CPU access signal, an external read/write command signal $\phi_{R/W}$ will be is generated during the period of the write command signal $\phi_4$ by a method not shown and will be applied to the gate of a transistor $Q_6$ switching $Q_6$ on and connecting the data write line 12 through terminal 14 to a source of external signals such as a CPU. Thus, the data on the data write line 12 can be read out through the terminal 14, or external data can be written into the capacitor $C_1$ through the data write line 12 and the write gate $Q_1$ by signals coming through the terminal 14.

If no charge is originally present in the capacitor $C_1$ and the write signal $\phi_4$ returns to the low level cutting off $\phi_4$ too soon the charge on the capacitor $C_2$ not yet have fully discharged to ground and a high level will be transferred to the capacitor $C_1$, because the capacitor $C_2$ is far larger than the capacitor $C_1$. The stored data in the capacitor $C_1$ of the memory cell 10 will then be inverted, and thereby destroyed. Accordingly, once the write signal $\phi_4$ has risen to the high level it must continue for at least a period $T_{x1}$ which is the period necessary for the capacitor $C_2$ of the data write line 12 to be sufficiently discharged.

The memory cell shown in FIG. 5 is basically the same as the of FIG. 4, excepting that the former is adapted to the method in which the inverted data is rewritten, while the latter adopts the method in which the data is rewritten at the same level. In this memory cell, a data line 13 is used both as the data read line 11 and data write line 12 of the cell of FIG. 4.

In FIG. 5, the capacitor $C_2$ of the data line 13 is precharged during the reset period $T_R$. When the read signal $\phi_2$ turns to a high level, the level inverse to that of the capacitor $C_1$ is stored temporarily in the capacitor $C_2$, since if $C_1$ is charged it will bias $Q_2$ on and $C_3$ will discharge through $Q_3$ and $Q_2$ to ground and if $C_1$ is uncharged $Q_2$ will be off and the charge will remain on $C_3$. Then the read signal $\phi_2$ turns to a low level, and the write signal $\phi_4$ turns to a high level. The write gate transistor $Q_1$ will conduct and since the capacity $C_1$ is smaller than the capacity $C_2$, the level of the voltage capacitor $C_1$ is lower than that of the capacitor $C_2$, the level of the capacitor $C_1$ will be inverted, and the inverted level will be stored in the capacitor $C_1$ . In the memory cell of FIG. 5, the level of the capacitor $C_1$ cannot fully be inverted, if the write signal $\phi_4$ returns to a low level too rapidly and cuts off $Q_1$ too soon. Therefore, the write signal $\phi_4$ once it has turned to a high level should remain at the high level for at least the time period $T_{x2}$ which is necessary for the capacitor $C_1$ to be fully inverted.

In both the memory cells shown in FIGS. 4 and 5, the stored information may be destroyed, if a CPU access signal is supplied simultaneously with or immediately after the write signal $\phi_4$ starts to rise to the high level. The access signal will cause the write signal $\phi_4$ to be returned to a low level without remaining at a high level for a minimum period of time Tx that is equal to the mentioned period of time $T_{x1}$ or $T_{x2}$ which is necessary to prevent data destruction. For example, FIGS. 3 (*a*) and 3 (*b*) illustrate the effect of a CPU access signal supplied at a time point $T_3$ when the write signal $\phi_4$ has just risen. This access signal changes the control signal $\phi$ to the low level, thereby raising the signal $\phi_1$ as indicated by a dotted line $\phi_{1\text{-}0}$. As a result, the signal $\phi_{D1}$ rises and $\phi_3$ drops, and since high signal $\phi_{D1}$ is connected to NOR circuit 8 the write signal $\phi_4$ becomes low during the period $T_x$, all as indicated by dotted lines $\phi_{D1\text{-}0}$, $\phi_{3\text{-}0}$ and $\phi_{4\text{-}0}$, respectively resulting in the destruction of the data stored in the cell as described above.

This problem has been solved according to the present invention as shown in the embodiments of the invention illustrated in FIGS. 6, 8, 9 and 10.

Figure 6:
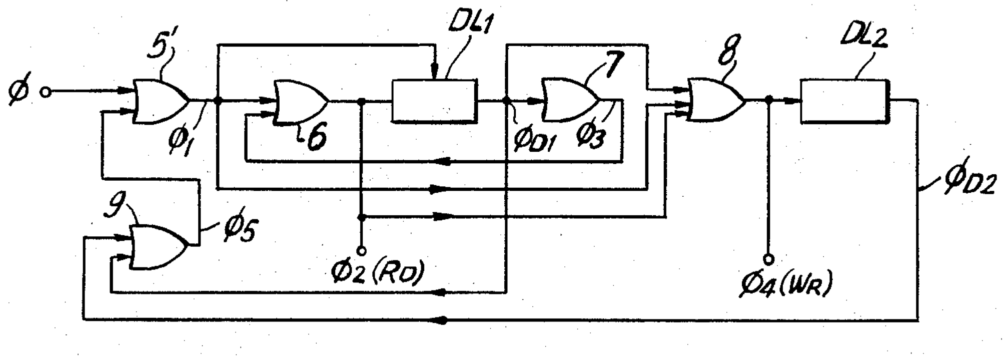
FIGS. 6, 8, 9, and 10 are block diagrams of circuits for generating command signals for memory system according to embodiments of the invention.
Figure 7:
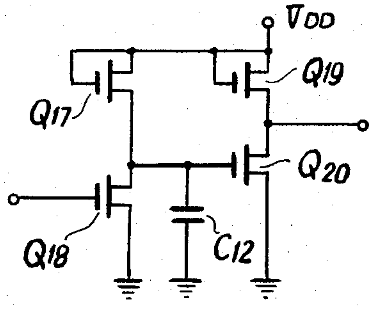
FIG. 7 shows an example of a delay circuit used in the circuits of FIGS. 6, 8, 9 and 10.

Referring to a first embodiment of the invention as shown in FIG. 6, a two-input NOR circuit 9 and a delay circuit $D_{L2}$ are added to the conventional circuit shown in FIG. 2, (*a*), and a two-input NOR circuit 5' is used in place of the first stage inverter 5 of FIG. 2(*a*). The write signal $\phi_4$, that is the output of the last stage NOR circuit 8, is applied to the added delay circuit $DL_2$. The output $\phi_{D2}$ of the added delay circuit $DL_2$ and the output $\phi_{D1}$ of the delay circuit $DL_1$ are both applied as inputs to the added two-input NOR circuit 9. The output $\phi_5$ of this NOR circuit 9 is applied to one input of the substituted two input NOR circuit 5' while the control signal $\phi$ is applied to the other input of circuit 5'. These added and substituted circuits $DL_2$, 9 and 5' constitute means for clamping the write signal $\phi_4$ at the high level at least for the period $T_x$ even if a CPU access signal is supplied to the memory circuit during the period Tx. The output $\phi_{D2}$ of the delay circuit $D_{L2}$ is in phase with the write signal 4. The delay circuit $D_{L2}$ is arranged so that the output $\phi_{D2}$ becomes high after the signal $\phi_4$ has remained at a high level for a sufficient period of time ($T_x$) for the successful completion of the rewriting operation. In other words, the write signal $\phi_4$ is delayed by the delay circuit $D_{L2}$ for a period of time of at least Tx, thus resulting in a signal $\phi_{D2}$ as shown in FIG. 3(*b*). This delay circuit $DL_2$ as shown in FIG. 7 comprises load transistors $Q_{17}$ and $Q_{19}$, and switching transistors $Q_{18}$ and $Q_{20}$. The switching transistor $Q_{18}$ has its drain connected to the gate of the switching transistor $Q_{20}$, and a delaying capacitor $C_{12}$ is connected between the gate of the transistor $Q_{20}$ and the ground. Operation of the circuit of FIG. 6 will be described below by referring to FIGS. 3(*a*) and 3(*b*).

The signal $\phi_5$ is maintained at a low level, when either the signal $\phi_{D1}$ or the signal $\phi_{D2}$ is at a high level since NOR circuit 9 produces a high output $\phi_5$ only when both inputs are low. Under this condition, the output $\phi_1$ of the NOR circuit 5' is at a high level since the control signal $\phi$ and $\phi_5$ are both low. Therefore, the other signals of the circuit are at levels similar to those in case of the circuit of FIG. 2 when the low control signal is applied during the reset period. When the control signal $\phi$ rises to a high level, the individual circuits operate in succession as illustrated with respect to FIG. 2 and the signals $\phi_1$ and turn to a low level. At this moment, the signal $\phi_{D2}$ is at a low level and hence the signal $\phi_5$ rises to a high level. Thereafter the signal $\phi_4$ rises to a high level. Then, after the write signal $\phi_4$ has remained at a high level for the period of Tx, which is a sufficient length of time to permit the rewriting step to be completed, the signal $\phi_{D2}$ turns to a high level causing the signal $\phi_5$ to return to a low level since NOR circuit 9 has one high and one low input. Following this operation, the control signal $\phi$ becomes low in the level for the reset period. Thus one refreshing cycle ends. A series of the above operations are the same as those described by referring to FIG. 2. The time interval $T_H$ during which the clamping signal $\phi_5$ is at a high level is longer than the period Tx but includes the period Tx. Because the clamping signal $\phi_5$, as well as the control signal $\phi$, goes to the inputs of the two-input NOR circuit 5', the output signal $\phi_1$ of the NOR circuit 5' will remain at a low level, even if the control signal $\phi$ turns into a low level during the fatal period Tx since $\phi_5$ is still at a high level.

If for example, a CPU access signal is supplied at the time $T_3$ which occurs during the fatal period Tx, the control signal $\phi$ immediately becomes low but the clamping signal $\phi_5$ remains at a high level, with the result that the output $\phi_1$ of the NOR circuit 5' receiving both the control signal $\phi$ and clamping signal $\phi_5$ can not rise. Since $\phi_1$ does not rise the write signal $\phi_4$ is not changed to the low level during the fatal period Tx. After the passage of time interval Tx, during which errors may occur due to the interruption of refreshing cycle, the signal $\phi_{D2}$ becomes high in level, causing the clamping signal $\phi_5$ to fall to a low level and permitting the signal $\phi_1$ to become high as indicated by $\phi_{1\text{-}1}$. Thus, the circuit returns to the initial state, and $\phi_{D1}$ rises, $\phi_3$ falls and $\phi_4$ falls as indicated in FIG. 3(*b*) by $\phi_{D1\text{-}1}$, $\phi_{3\text{-}1}$ and $\phi_{4\text{-}1}$, respectively.

If the control signal $\phi$ falls to a low level before the clamping signal $\phi_5$ becomes high, that is, at a time outside time period $T_H$ which includes time period $T_x$, the signal $\phi_1$ will immediately rise. As a consequence of the rise of $\phi_1$, the refreshing cycle is interrupted before the write signal $\phi_4$ has risen to a high level. This means that whether the refreshing should continue or be discontinue when an access signal is received is automatically judged in the circuit by detecting whether or not the clamping signal $\phi_5$ is at a high level.

Figure 8:
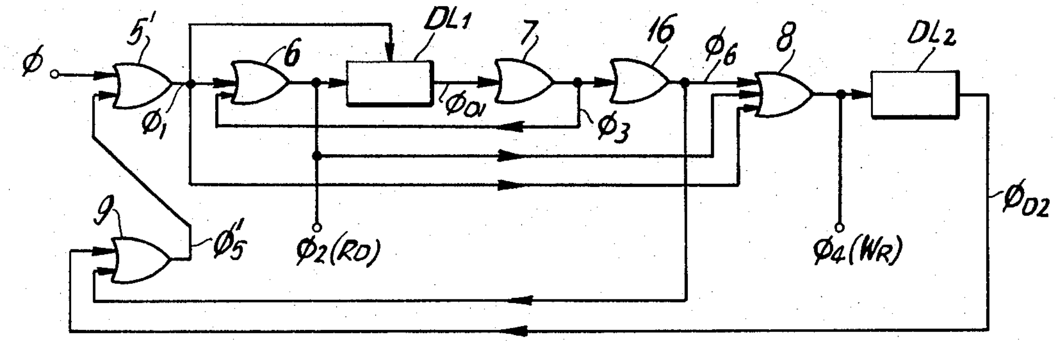

Referring to FIG. 8, a second embodiment of the invention employs an additional inverter 16 between the inverter 7 and the three-input NOR circuit 8 shown in the circuit of FIG. 6. The output $\phi_3$ of the inverter 7 is applied to the added inverter 16 and the inverter 16 output $\phi_6$, which is approximately an inverted form of $\phi_3$, is connected to NOR circuit 8 in place of $\phi_{D1}$. Since this output $\phi_6$ is delayed with respect to $\phi_{D1}$ because of operations of two inverters 7 and 16, the signal $\phi_6$ will determine the time when the write signal $\phi_4$ rises and therefore will also the time when the clamping signal $\phi_5'$ rises. Therefore, the period $T_H'$ of the clamping signal $\phi_5'$ becomes approximately coincident with the fatal period Tx of the write signal $\phi_4$.

Figure 9:
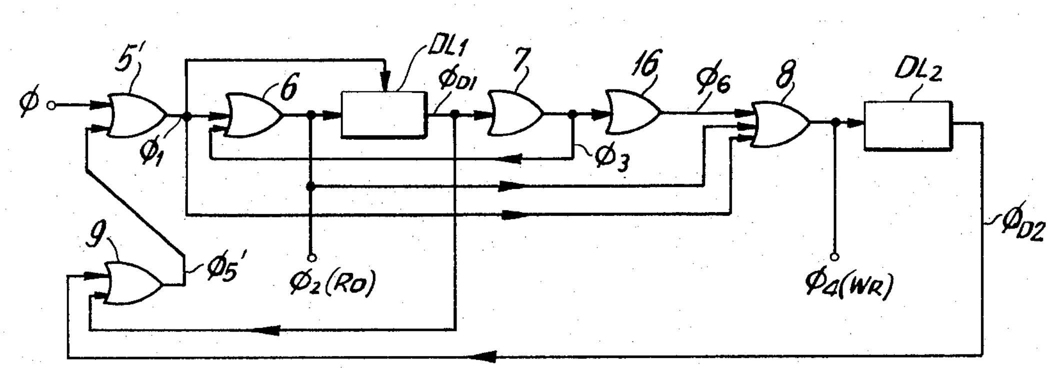

In a third embodiment shown in FIG. 9, $\phi_{D1}$ is used as an input of the clamping signal generator 9, in place of $\phi_6$ of the second embodiment. In this case, the clamping signal $\phi_5'$ will be the same as in the case of the embodiment of FIG. 6.

Figure 10:
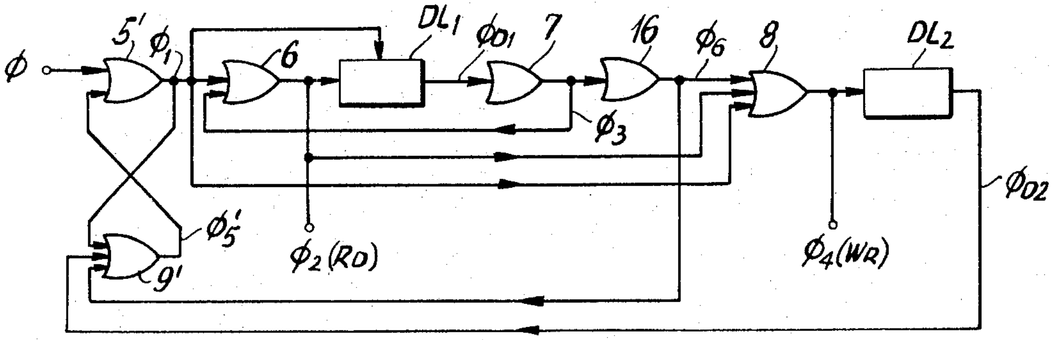

FIG. 10 illustrates a fourth embodiment of the invention wherein the two-input NOR circuit 9 which is the clamping signal generator of the second embodiment shown in FIG. 8 is replaced by the three-input NOR circuit 9' and the output signal $\phi_1$ of the first-stage NOR circuit 5' is applied to the third input of the NOR circuit 9'.

This embodiment prevents both the output signal $\phi_1$ and the clamping signal $\phi_5'$ from remaining at intermediate levels when these two signals start rising simultaneously.

According to this invention, as has been described above, the device for generating the read and write signals and the device for generating the refreshing signal can be operated independently of each other, since the interruption of a refreshing cycle is controlled so that the read or write signal can be preferentially processed. Therefore, by the use of this invention, a dynamic memory can be operated like a static memory.

Although the foregoing example embodiments utilized N-channel type MOS transistors, P-channel type MOS transistors may similarly be used. It is also evident that this invention is readily applicable to dynamic memories of the type using bipolar transistors, in which refreshing is needed.

While specific embodiments of the invention have been illustrated and described in detail, it is particularly understood that the invention is not limited thereto or thereby.

What is claimed is:

1. A memory circuit having storage means for storing information signals includes means for performing a refreshing operation in which said stored information signals are rewritten into said storage means and in which said stored information can be destroyed by termination of said refreshing operation within a first period of time during said operation, reset means for generating a first signal to terminate said refreshing operation and to reset said memory circuit to a predetermined condition, means responsive to said first signal to generate a rewrite signal, clamping means responsive to said rewrite signal for generating a clamping signal during a second period of time at least equal in duration to said first period of time during which the stored information in said storage means may be destroyed by the termination of said refreshing operation, said clamping signal being present at least from the beginning of said rewrite signal to the end of said first period of time, said clamping signal being applied to said first signal generating means to prevent the generation of said first signal, whereby said refreshing operation is caused to continue during the presence of said clamping signal.

2. A memory circuit as claimed in claim 1, wherein said means responsive to said first signal includes first delay means which generates a first delayed signal.

3. A memory circuit as claimed in claim 2 including second delay means responsive to said rewrite signal to generate a second delayed signal said second delayed signal being delayed by said second period of time.

4. A memory circuit as claimed in claim 3, wherein said clamping means includes a first NOR circuit having first and second inputs said first delayed signal being connected to one of said inputs and said second delayed signal being connected to the other of said inputs; said reset means including a second NOR circuit, and the output of said first NOR circuit being connected to one of the outputs of said second NOR circuit.

5. A memory circuit as claimed in claim 3, wherein said clamping means includes a first NOR circuit having three inputs, and said reset means includes a second NOR circuit, said first delayed signal being connected to the first input of said first NOR circuit, said second delayed signal being connected to the second input of said first NOR circuit and the output of said second NOR circuit being connected to the third input of said first NOR circuit and the output of said first NOR circuit being applied to one of the inputs of said second NOR circuit.

6. A memory circuit as claimed in claim 3, in which additional delay means are series connected between said first delay means and said clamping means.

7.. A memory circuit comprising storage means for storing information signals includes means for generating a rewrite command signal, rewrite means responsive to said rewrite command signal for rewritting said stored information into said storage means, delay means responsive to said rewrite command signal to generate a signal delayed for a predetermined period of time, said predetermined period of time being sufficient for the stored information to be rewritten into said storage means, means for generating a reset signal to reset said memory circuit to a predetermined condition, and a clamping signal generator responsive to said delayed signal to generate a clamping signal, said clamping signal being present at least during the period from the occurance of said rewrite command signal to the end of said predetermined period, said clamping signal being applied to said reset signal generating means to prevent the generation of said reset signal, whereby said stored information is rewritten into said storage means while said clamping signal is present.

8. A memory circuit comprising storage means for storing information signals, means for performing a refreshing operation in which said stored information signals are rewritten into said storage means and in which said stored information can be destroyed by terminating said refreshing operation during first predetermined period of said operation, means for generating a first signal to terminate the refreshing operation and to reset the memory circuit to a predetermined condition, read out means responsive to said reset signal for reading out said stored information from said storage means during a second predetermined time period, first delay means responsive to said read out means for generating a second signal indicating the termination of said second predetermined time period, means responsive to said second signal for generating a third signal commanding the rewriting of said stored information into said storage means, second delay means responsive to said third signal to provide an output signal delayed by a period of time sufficient to prevent the destruction of said stored information by the termination of said refreshing operation during said rewriting, and a clamping signal generator responsive to said second signal and to the output of said delaying means to generate a clamping signal during the period between the termination of said second signal and the occurrence of said output signal of said delaying means, said clamping signal being applied to said first signal generating means to prevent the generation of said first signal.

* * * * *